(12) United States Patent
Lussier

(10) Patent No.: US 10,107,202 B2
(45) Date of Patent: Oct. 23, 2018

(54) COMPOSITE FAN HOUSING ASSEMBLY OF A TURBOFAN ENGINE AND METHOD OF MANUFACTURE

(71) Applicant: United Technologies Corporation, Hartford, CT (US)

(72) Inventor: Darin S. Lussier, Guilford, CT (US)

(73) Assignee: United Technologies Corporation, Farmington, CT (US)

( * ) Notice: Subject to any disclaimer, the term of this patent is extended or adjusted under 35 U.S.C. 154(b) by 538 days.

(21) Appl. No.: 14/933,743

(22) Filed: Nov. 5, 2015

(65) Prior Publication Data

US 2016/0201561 A1 Jul. 14, 2016

Related U.S. Application Data

(60) Provisional application No. 62/084,886, filed on Nov. 26, 2014.

(51) Int. Cl.
| | | |
|---|---|---|
| *F01D 25/24* | (2006.01) | |
| *F02C 7/20* | (2006.01) | |
| *F04D 29/40* | (2006.01) | |
| *F02K 1/72* | (2006.01) | |
| *F02K 1/76* | (2006.01) | |

(52) U.S. Cl.
CPC ............. *F02C 7/20* (2013.01); *F02K 1/72* (2013.01); *F02K 1/766* (2013.01); *F04D 29/403* (2013.01); *F05D 2300/603* (2013.01)

(58) Field of Classification Search
CPC ...... F04D 29/522; F05D 2250/75; F02K 1/32; F02K 1/72; F02K 1/766; F02K 1/68; F01D 25/24; F01D 25/243
See application file for complete search history.

(56) References Cited

U.S. PATENT DOCUMENTS

| | | | |
|---|---|---|---|
| 4,998,409 A | | 3/1991 | Mutch |
| 5,431,532 A | * | 7/1995 | Humke ................ F01D 21/045 |
| | | | 415/9 |
| 7,246,990 B2 | | 7/2007 | Xie et al. |
| 7,390,161 B2 | | 6/2008 | Xie et al. |
| 8,021,102 B2 | | 9/2011 | Xie et al. |
| 8,333,558 B2 | | 12/2012 | Finn et al. |
| 8,545,167 B2 | | 10/2013 | Cheung |
| 8,672,609 B2 | | 3/2014 | Lussier et al. |
| 8,740,558 B2 | | 6/2014 | Robertson, Jr. et al. |
| 8,887,511 B2 | * | 11/2014 | Germain ................ B64D 29/06 |
| | | | 244/110 B |
| 8,979,473 B2 | | 3/2015 | Lussier et al. |

(Continued)

OTHER PUBLICATIONS

Extended EP Search Report dated Apr. 13, 2016.

*Primary Examiner* — Ninh H Nguyen
(74) *Attorney, Agent, or Firm* — O'Shea Getz P.C.

(57) ABSTRACT

A fan housing assembly of a turbofan engine and method of manufacture includes a fan housing that defines a flowpath radially inward, and a groove structure attached to and located aft of the housing for connection to a stationary portion of an outer shell of a thrust reverser. The groove structure includes a base portion concentrically located about an engine axis, and aft and leading legs spaced axially apart from one another and projecting radially outward from the base portion. The fan housing, the base portion, and the aft and leading legs are made of a one-piece composite material.

18 Claims, 4 Drawing Sheets

(56) References Cited

U.S. PATENT DOCUMENTS

| | | |
|---|---|---|
| 9,109,462 B2 | 8/2015 | Suciu et al. |
| 9,114,882 B2 | 8/2015 | Robertson, Jr. et al. |
| 9,140,135 B2 | 9/2015 | Robertson, Jr. et al. |
| 9,149,997 B2 | 10/2015 | Foster et al. |
| 9,151,181 B2 | 10/2015 | Robertson et al. |
| 9,248,612 B2 | 2/2016 | Zhu et al. |
| 2008/0115454 A1* | 5/2008 | Xie .................. F01D 21/045 52/783.1 |
| 2009/0260344 A1 | 10/2009 | Hoyland |
| 2012/0099975 A1 | 4/2012 | Robertson, Jr. et al. |
| 2013/0277454 A1 | 10/2013 | Hurlin et al. |
| 2013/0298524 A1* | 11/2013 | Le Boulicaut ......... B64D 29/08 60/226.2 |
| 2015/0275689 A1 | 10/2015 | Lussier et al. |
| 2016/0010503 A1 | 1/2016 | Robertson, Jr. et al. |
| 2016/0032776 A1 | 2/2016 | Voleti et al. |

\* cited by examiner

COMPOSITE FAN HOUSING ASSEMBLY OF A TURBOFAN ENGINE AND METHOD OF MANUFACTURE

This application claims priority to U.S. Patent Appln. No. 62/084,886 filed Nov. 26, 2014.

BACKGROUND

The present disclosure relates to a fan housing assembly of a turbofan engine and more particularly to a non-metallic composite fan housing assembly and method of manufacture.

Turbofan engines include a fan section having a plurality of circumferentially spaced fan blades surrounded by a fan housing assembly supported within a nacelle and generally designed to inhibit projectile travel. Fan housing assemblies are known to include a generally cylindrical housing made of a non-metallic composite material to minimize weight. The assemblies further include V-grooves for supporting and connecting to a thrust reverser located downstream of the fan section, and flanges projecting radially outward from the housing to secure and support various components. Unfortunately, the flanges and V-grooves are typically made of metallic materials for strength and wear thus adding weight to the fan section and complicating manufacturing with the additional parts. There exists a need to reduce weight of the fan section, and reduce manufacturing cost and complexity.

SUMMARY

A groove structure of a fan housing assembly for securing a thrust reverser of a turbofan engine according to one, non-limiting, embodiment of the present disclosure includes a base portion concentrically located about an engine axis; an aft leg projecting radially outward from the base portion; and a leading leg projecting radially outward from the base portion and spaced axially from the aft leg, and wherein the base portion, the aft leg and the leading leg are made of a one-piece composite material.

Additionally to the foregoing embodiment, the groove structure includes a seal located between the aft and leading legs and proximate to the base portion.

In the alternative or additionally thereto, in the foregoing embodiment, the groove structure includes a wear liner generally exposed radially outward and attached to the aft leg, the leading leg and the base portion.

In the alternative or additionally thereto, in the foregoing embodiment, the wear liner is metallic.

In the alternative or additionally thereto, in the foregoing embodiment, the one-piece composite material is non-metallic.

In the alternative or additionally thereto, in the foregoing embodiment, the groove structure includes a seal located between the aft and leading leg and in contact with the liner at the base portion.

In the alternative or additionally thereto, in the foregoing embodiment, the groove structure includes a leading portion projecting forward from the leading leg that extends between the base portion and the leading portion, and wherein the wear liner is in-part attached to the leading portion and faces radially outward.

In the alternative or additionally thereto, in the foregoing embodiment, the groove structure includes a stop block projecting radially outward from the wear liner at the leading portion.

In the alternative or additionally thereto, in the foregoing embodiment, the stop block and the leading liner are made of a one-piece metallic material.

A fan housing assembly of a turbofan engine according to another, non-limiting, embodiment includes a fan housing located about an engine axis and defining a flowpath radially inward; and a groove structure at least in-part located aft of and attached to the fan housing, the groove structure having a base portion concentrically located about the engine axis, an aft leg projecting radially outward from the base portion, and a leading leg projecting radially outward from the base portion and spaced axially from the aft leg, and wherein the fan housing, the base portion the aft leg and the leading leg are made of a composite material.

Additionally to the foregoing embodiment, the groove structure includes a wear liner generally exposed radially outward and attached to at least the leading leg.

In the alternative or additionally thereto, in the foregoing embodiment, the housing assembly includes a flange attached to and projecting radially outward from the fan housing and made of a composite material.

In the alternative or additionally thereto, in the foregoing embodiment, an adhesive bonds the flange to the fan housing.

In the alternative or additionally thereto, in the foregoing embodiment, an adhesive bonds the groove structure to the fan housing.

In the alternative or additionally thereto, in the foregoing embodiment, the groove structure is constructed and arranged to receive a V-blade.

A method of manufacturing a fan housing assembly for a turbofan engine according to another, non-limiting, embodiment includes the steps of forming a fan housing of a composite material; forming at least a portion of a groove structure of a composite material; and attaching the fan housing to the portion of the groove structure.

Additionally to the foregoing embodiment, the fan housing is attached to the portion with an adhesive.

In the alternative or additionally thereto, in the foregoing embodiment, the fan housing and the portion are formed in unison and as one continuous composite material.

In the alternative or additionally thereto, in the foregoing embodiment, the method includes the step of adhering a wear liner to the portion.

In the alternative or additionally thereto, in the foregoing embodiment, the method includes the step of forming a flange in unison with the fan housing and as one continuous composite material.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
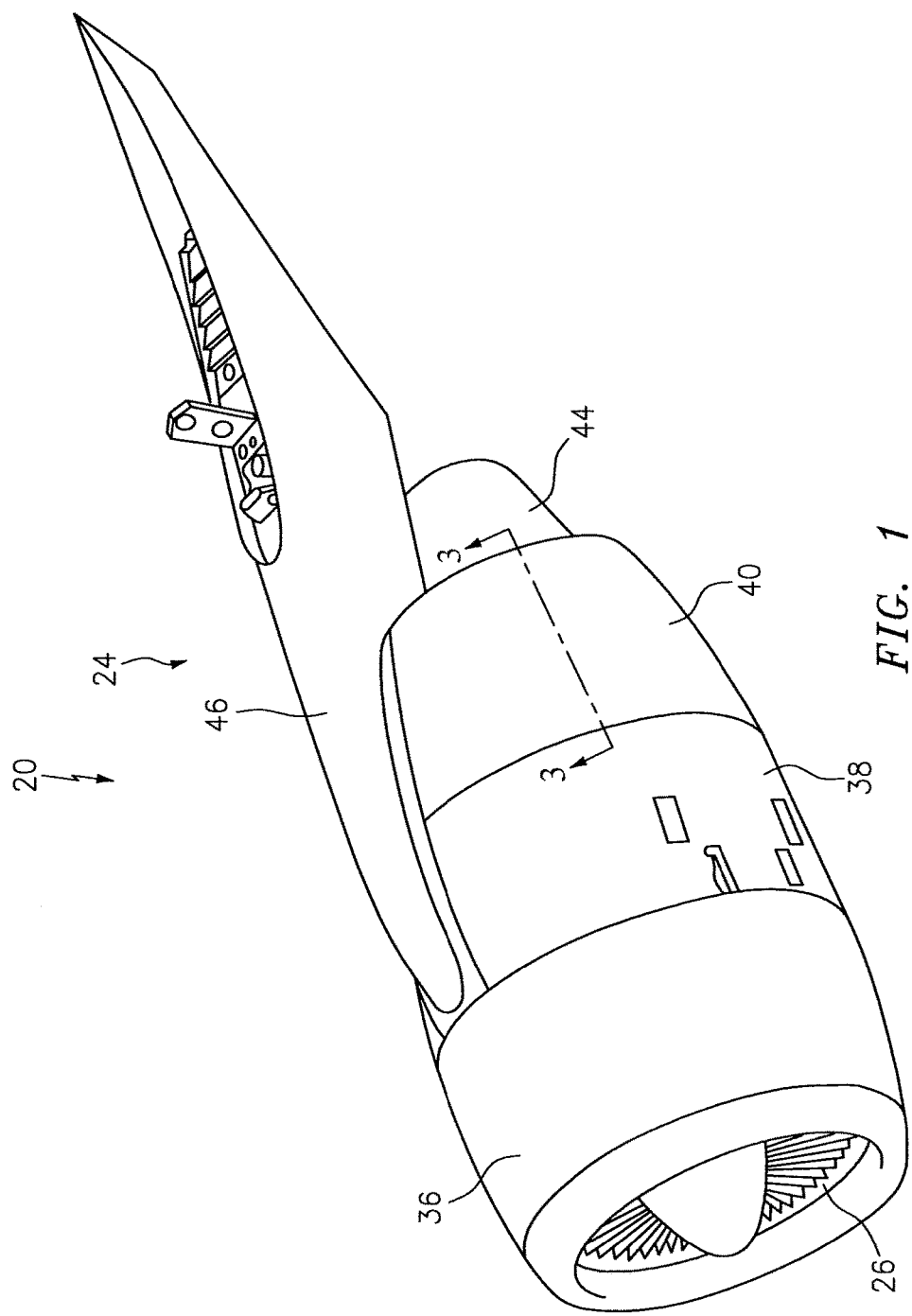
FIG. 1 is a perspective view of a turbofan engine according to one non-limiting embodiment of the present disclosure.
Figure 2:
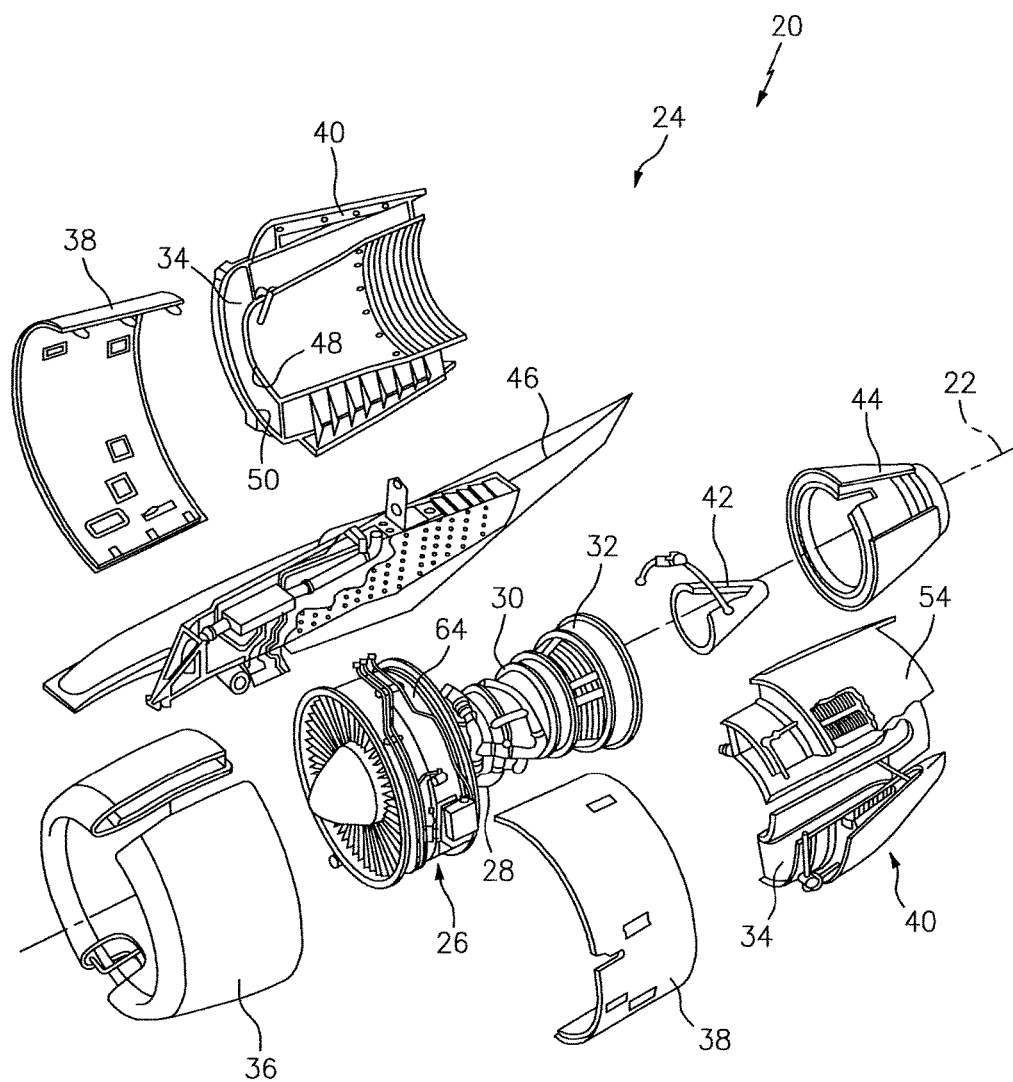
FIG. 2 is an exploded view of the turbofan engine.

Referring to FIGS. 1 and 2, a turbofan engine 20 is centered about an engine axis 22 and includes a nacelle 24 that supports and generally surrounds an inner engine core that includes a fan section 26, a compressor section 28, a combustor section 30 and a turbine section 32. The fan section 26 drives air along a bypass flowpath or duct 34 and the combustor section 30 receives a portion of air from the fan section 26 and drives air along a core flowpath (not shown) for compression by the compressor section 28, then into the combustor section 30. The core air is mixed with fuel in the combustor section 30 and burned producing energy. The core air or exhaust from the combustor section 30 is expanded through the turbine section 32 and, in-turn, drives a central shaft (not shown) that powers the fan section 26.

The combusted core airflow flowing through the turbine generally powers the fan section 26 and the bypass airflow provides the majority of forward propulsion for the engine 20. More traditional turbofan engines may have a bypass airflow to core airflow ratio (i.e. bypass ratio) of about six (6:1). More recent high-bypass ratio engines, such as a geared turbofan engine may have greater bypass ratios that may exceed ten (10:1).

The nacelle 24 may include an intake cowl 36 disposed forward of the fan section 26, a fan cowl 38 that circumferentially surrounds and shields the fan section 26, a thrust reverser 40 that may circumferentially surround the compressor, combustor and turbine sections 28, 30, 32, an exhaust centerbody 42 aft of the turbine section 32, an exhaust nozzle 44 that is spaced radially outward from the exhaust centerbody 42, and a pylon 46 that supports the engine 20 typically to an undercarriage of an aircraft wing (not shown). The intake cowl 36, the fan section and cowl 26, 38, and the thrust reverser 40 are concentric to the engine axis 22.

Figure 3:
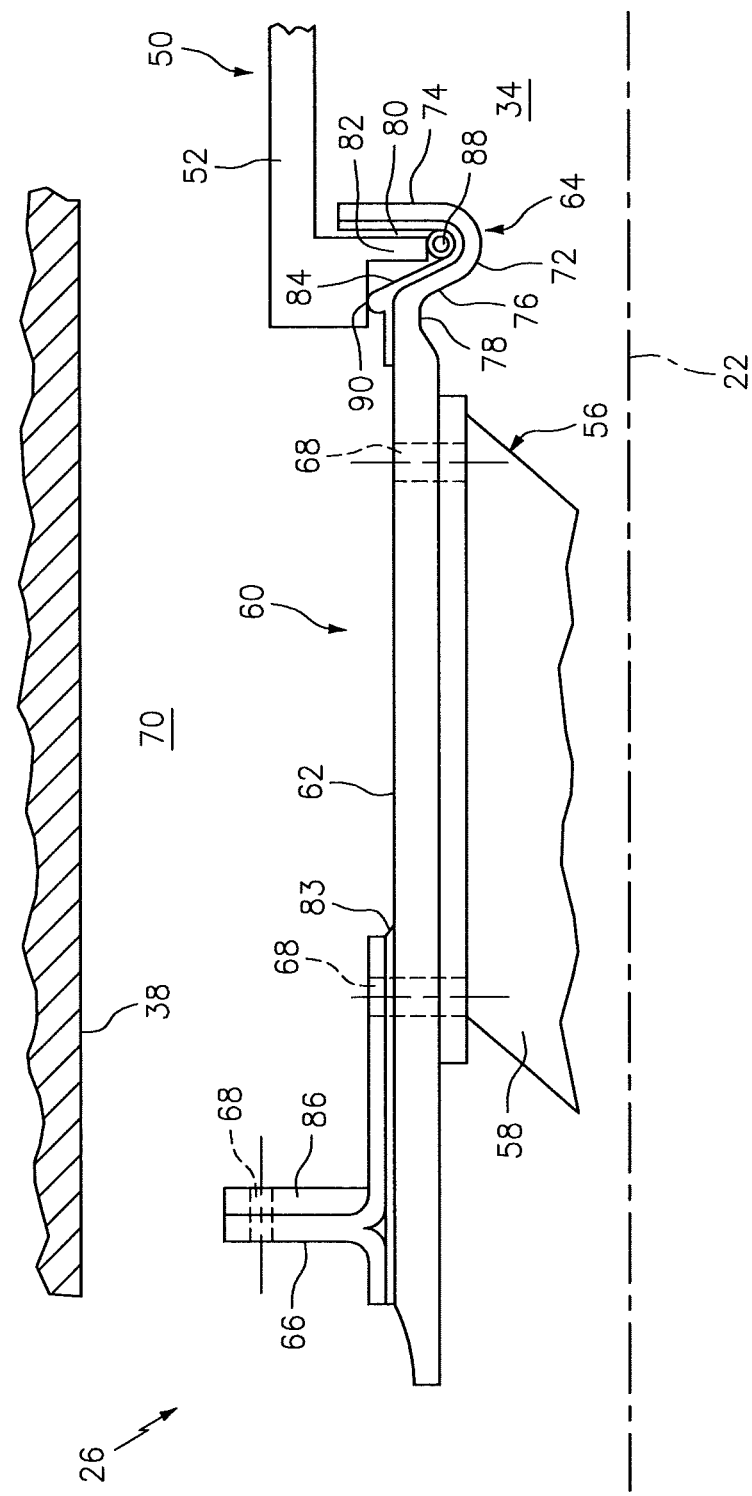
FIG. 3 is a partial cross section of a fan section of the engine detailing a fan housing assembly.

Referring to FIGS. 2 and 3, the thrust reverser 40 may have a plurality of circumferentially spaced blocker doors (not shown), a radially inner shell 48, and an outer shell 50 spaced radially outward from the inner shell 48 and defining at least in-part the bypass flowpath 34 therebetween. The outer shell 50 may have a stationary leading portion 52 fixed to the fan section 26, and an axially translating portion 54 (see FIG. 2) constructed and arranged to move in an axially downstream direction when the thrust reverser 40 moves from a stowed state to a deployed state. When in the stowed state, the blocker doors do not obstruct the bypass flowpath 34, and when in the deployed state the blocker doors are configured to obstruct flowpath 34 and divert airflow generally in a forward direction.

The fan section 26 includes a vane assembly 56 having a plurality of circumferentially spaced guide vanes 58, and a fan housing assembly 60 spaced radially inward from the fan cowl 38 of the nacelle 24. The vane assembly 56 is connected to and projects radially inward from the housing assembly 60; thereby, centering and connecting the housing assembly to the inner engine core. The fan housing assembly 60 may include a cylindrical fan housing 62 designed to contain any potential projectiles within the fan section, a ring-shaped groove structure 64 (i.e. V-groove), and at least one flange 66. The housing 62 may include a plurality of circumferentially and axially spaced holes 68 for receipt of fasteners or bolts that rigidly connect the vane assembly 56 to the radially inward side of the fan housing 62.

The groove structure 64 is rigidly connected, or formed, to an aft end portion of the housing 62 and generally receives and/or connects to the leading portion 52 of the outer shell 50 of the thrust reverser 40. The flange 66 connects to and projects radially outward from the fan housing 62 and may support various accessory components generally located in a cavity 70 defined radially between the fan housing 62 and the fan cowl 38. Examples of such components may include thrust reverser actuators and linkages (e.g. hold-open rods), tubing, electrical harnesses and others. Yet further, the flange 66 may be utilized to secure the fan cowl 38 to the fan section 26 (not shown). It is further contemplated and understood that the fan cowl 38 may be secured to the outer shell 50 of the thrust reverser 40.

The groove structure 64 may include an annular base portion 72, an annular aft leg 74, an annular leading leg 76, and an annular leading portion 78. The aft and leading legs 74, 76 project substantially radially outward from respective aft and leading ends of the base portion 72 and are spaced axially from one-another defining a groove 80 therebetween. The leading leg 76 generally spans between the base portion 72 and the leading portion 78, and the leading portion 78 projects axially upstream from the leg 76 to form or connect to an aft end portion of the fan housing 62. The leading portion 52 of the outer shell 50 includes a radially inward projecting rib 82 (i.e. V-blade) received in the groove 80 for attaching the thrust reverser 40 to the fan section 26, and capable of withstanding cyclic thrust reverser loads.

The fan housing 62, the flange 66, the base portion 72, the aft leg 74, the leading leg 76 and the leading portion 78 may be made of a non-metallic composite material comprised of a plurality of layers and directional fibers. In order to withstand inter-laminar loading, thickness ties or three dimensional weaves may be utilized as part of the composite material. As illustrated in FIG. 3, the housing 62, the flange 66, the base portion 72, the aft leg 74 and the leading leg 76 may be formed in unison during the manufacturing process thus producing one homogeneous and continuous piece. The flange 66 may be formed of a composite material, separately, and then adhered to a radially outward side of the housing 62 with an adhesive 83. More specifically and if the flange is circumferentially continuous, the flange 66 may first be manufactured as two circumferentially extending segments, then adhered to the fan housing 62 forming one continuous flange. One, non-limiting, example of an adhesive are epoxy-based. It is further contemplated and understood that any one portion or more of the groove structure may be made of a composite material and not necessarily all of the base structure.

The groove structure 64 may further include a wear resistant liner 84 that covers the composite sides of the base portion 72, aft leg 74 and leading leg 76 that oppose the rib 82 (i.e. generally—the radially outward facing surface). The liner 84 may be made of a titanium or an aluminum alloy depending upon the wear resistance requirements. It is further contemplated and understood that a galvanic barrier may be required if, for example, aluminum is used against the carbon. One example of a galvanic barrier may be fiberglass. Moreover, metallic liners are only required if wear is of a considerable concern; otherwise, a liner made of fiberglass may be sufficient. Anti-gallant coatings, such as dry film lubricants, may be used on liners made of titanium and aluminum alloys.

The flange 66 may be reinforced with a metallic backing 86 that is adhered or mechanically applied to the flange. The metallic backing 86 may include a radius that corresponds to a radius of the flange 66 near the housing 62. The backing radius provides for the positioning of the metallic backing further radially inward towards the housing. Moreover, the radius provides an increased area of compression contact providing an increase in compression strength. The backing 86 may be aluminum or an integral composite material if loads permit. The backing 86 may further reduce flange bending by driving the bolt circle towards the housing 62, thereby reducing the flange prying factor.

The groove structure 64 may further include a resilient and circumferentially continuous seal 88 in contact with the wear liner 84 proximate to the base portion 72, and a metallic wear or stop block 90. The seal 88 may be compressed between the liner 84 and a distal end of the rib 82 of the stationary leading portion 52 of the outer shell 50, when the engine is fully assembled, to prevent air leakage. The stop block 90 may be an integral part of the liner 84 and generally projects radially outward from the leading portion 78 of the groove structure 64 to contact and radially align the leading portion 52 of the outer shell 50. The stop block 90 further prevents over-compression of the seal 88 during cyclic loading by the thrust reverser 40 that could potentially damage the groove structure 64. It is further contemplated and understood that the stop block 90 may be a plurality of stop blocks spaced circumferentially from one-another or may be one circumferentially continuous stop block.

Figure 4:
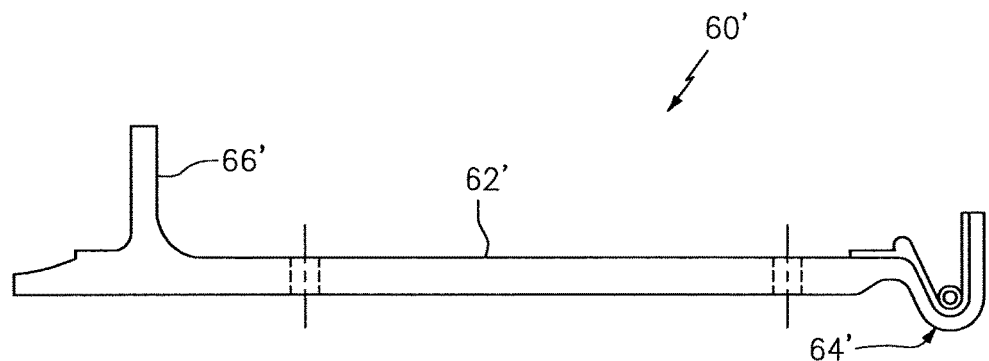
FIG. 4 is a partial cross section of a second embodiment of a fan housing assembly.

Referring to FIG. 4, a second embodiment of a fan housing assembly is illustrated wherein like elements to the first embodiment have like identifying numerals except with the addition of a prime suffix. The fan housing assembly 60' of the second embodiment has a flange 66' that is integrally formed as one unitary piece to a fan housing 62'. That is, the flange 66', the housing 62' and the base components of a groove structure 64' are all manufactured and molded in unison and as one piece made of a non-metallic composite material.

Figure 5:
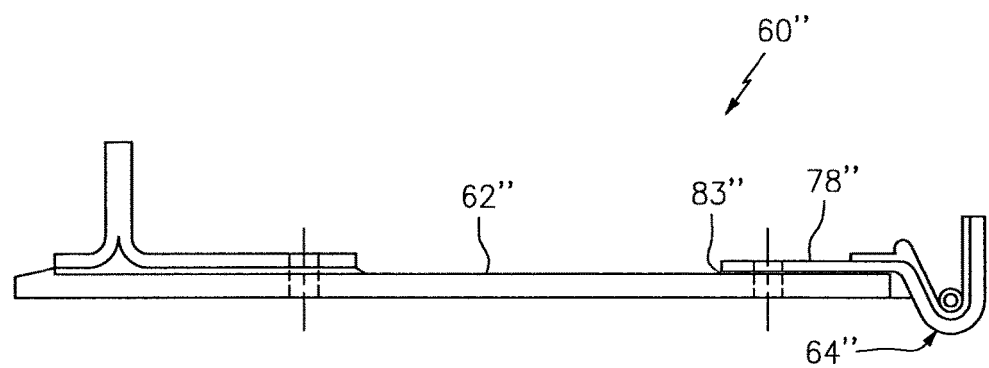
FIG. 5 is a partial cross section of a third embodiment of a fan housing assembly.

Referring to FIG. 5, a third embodiment of a fan housing assembly is illustrated wherein like elements to the first embodiment have like identifying numerals except with the addition of a double prime suffix. The fan housing assembly 60" of the third embodiment has a groove structure 64" with a leading portion 78" that is adhered to an outer side of a fan housing 62" with an adhesive 83". The base components of the groove structure 64" may be initially molded as a non-metallic, composite, part separate from the housing 62".

Figure 6:
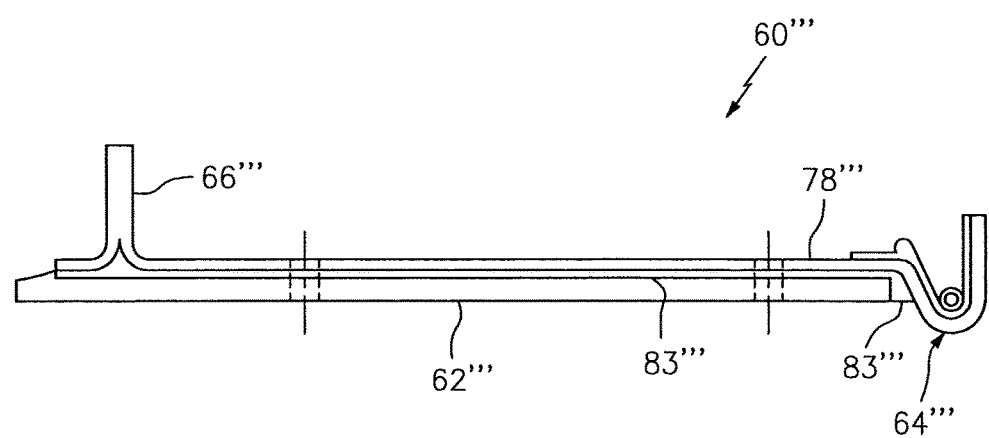
FIG. 6 is a partial cross section a fourth embodiment of a fan housing assembly.

Referring to FIG. 6, a fourth embodiment of a fan housing assembly is illustrated wherein like elements to the first embodiment have like identifying numerals except with the addition of a triple prime suffix. The fan housing assembly 60''' of the fourth embodiment has a flange 66''' that is directly attached to a leading portion 78''' of a groove structure 64'''. More specifically, the flange 66''' and the base components of the groove structure 64''' are manufactured in unison as one homogeneous and single part made of a non-metallic composite material. The flange 66''' and the groove structure 64''' may then be secured to a non-metallic composite fan housing 62''' with an adhesive 83''', or otherwise mechanically attached.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

What is claimed is:

1. A groove structure of a fan housing assembly for securing a thrust reverser of a turbofan engine comprises:
   a base portion concentrically located about an engine axis;
   an aft leg projecting radially outward from the base portion;
   a leading leg projecting radially outward from the base portion and spaced axially from the aft leg, and wherein the base portion, the aft leg and the leading leg are made of a one-piece composite material; and
   a seal located between the aft and leading legs and proximate to the base portion.

2. The groove structure set forth in claim 1 further comprising:
   a wear liner generally exposed radially outward and attached to the aft leg, the leading leg and the base portion.

3. The groove structure set forth in claim 2, wherein the wear liner is metallic.

4. The groove structure set forth in claim 2, wherein the seal is in contact with the liner at the base portion.

5. The groove structure set forth in claim 1, wherein the one-piece composite material is non-metallic.

6. A groove structure of a fan housing assembly for securing a thrust reverser of a turbofan engine comprises:
   a base portion concentrically located about an engine axis;
   an aft leg projecting radially outward from the base portion;
   a leading leg projecting radially outward from the base portion and spaced axially from the aft leg, and wherein the base portion, the aft leg and the leading leg are made of a one-piece composite material;
   a wear liner generally exposed radially outward and attached to the aft leg, the leading leg and the base portion; and
   a leading portion projecting forward from the leading leg that extends between the base portion and the leading portion, and wherein the wear liner is in-part attached to the leading portion and faces radially outward.

7. The groove structure set forth in claim 6 further comprising:
   a stop block projecting radially outward from the wear liner at the leading portion.

8. The groove structure set forth in claim 7, wherein the stop block and the leading liner are made of a one-piece metallic material.

9. A fan housing assembly of a turbofan engine comprising:
   a fan housing located about an engine axis and defining a flowpath radially inward;
   a groove structure at least in-part located aft of and attached to the fan housing, the groove structure having a base portion concentrically located about the engine axis, an aft leg projecting radially outward from the base portion, and a leading leg projecting radially outward from the base portion and spaced axially from the aft leg, and wherein the fan housing, the base portion the aft leg and the leading leg are made of a composite material; and a flange attached to and projecting radially outward from the fan housing and made of a composite material.

10. The fan housing assembly set forth in claim 9, wherein the groove structure includes a wear liner generally exposed radially outward and attached to at least the leading leg.

11. The fan housing assembly set forth in claim 9, wherein an adhesive bonds the flange to the fan housing.

12. A fan housing assembly of a turbofan engine comprising:

a fan housing located about an engine axis and defining a flowpath radially inward; and a groove structure at least in-part located aft of and attached to the fan housing, the groove structure having a base portion concentrically located about the engine axis, an aft leg projecting radially outward from the base portion, and a leading leg projecting radially outward from the base portion and spaced axially from the aft leg, and wherein the fan housing, the base portion, the aft leg and the leading leg are made of a composite material;

wherein an adhesive bonds the groove structure to the fan housing.

13. A fan housing assembly of a turbofan engine comprising:

a fan housing located about an engine axis and defining a flowpath radially inward; and a groove structure at least in-part located aft of and attached to the fan housing, the groove structure having a base portion concentrically located about the engine axis, an aft leg projecting radially outward from the base portion, and a leading leg projecting radially outward from the base portion and spaced axially from the aft leg, and wherein the fan housing, the base portion, the aft leg and the leading leg are made of a composite material;

wherein the groove structure is constructed and arranged to receive a V-blade.

14. A method of manufacturing a fan housing assembly for a turbofan engine comprising the steps of:

forming a fan housing of a composite material;

forming at least a portion of a groove structure of a composite material; and attaching the fan housing to the portion of the groove structure.

15. The method of manufacturing the fan housing assembly set forth in claim 14, wherein the fan housing is attached to the portion with an adhesive.

16. The method of manufacturing the fan housing assembly set forth in claim 14, wherein the fan housing and the portion are formed in unison and as one continuous composite material.

17. The method of manufacturing the fan housing assembly set forth in claim 14, comprising the further step of:

adhering a wear liner to the portion.

18. The method of manufacturing the fan housing assembly set forth in claim 14 comprising the further step of:

forming a flange in unison with the fan housing and as one continuous composite material.

\* \* \* \* \*